US008824867B2

(12) United States Patent
Weintraub et al.

(10) Patent No.: US 8,824,867 B2
(45) Date of Patent: Sep. 2, 2014

(54) SYSTEM AND METHOD FOR RECORDING RELATED PROGRAMS COMPRISING MEDIA CONTENT RELATED DATA

(75) Inventors: Ofer Weintraub, Hertzliya (IL); Haggai Barel, Herzliya Pituakh (IL); Lior Master, Bat Hefer (IL)

(73) Assignee: Orca Interactive Ltd., Ra'Anana (IL)

( * ) Notice: Subject to any disclaimer, the term of this patent is extended or adjusted under 35 U.S.C. 154(b) by 56 days.

(21) Appl. No.: 13/320,335

(22) PCT Filed: May 13, 2009

(86) PCT No.: PCT/IL2009/000482
§ 371 (c)(1),
(2), (4) Date: Nov. 14, 2011

(87) PCT Pub. No.: WO2010/131238
PCT Pub. Date: Nov. 18, 2010

(65) Prior Publication Data
US 2012/0063744 A1  Mar. 15, 2012

(51) Int. Cl.
*H04N 5/76* (2006.01)
*G11B 27/10* (2006.01)
*G11B 27/034* (2006.01)
*H04N 5/782* (2006.01)
*H04N 5/781* (2006.01)
*H04N 5/85* (2006.01)
*H04N 5/765* (2006.01)

(52) U.S. Cl.
CPC .............. *H04N 5/782* (2013.01); *G11B 27/105* (2013.01); *H04N 5/781* (2013.01); *G11B 27/034* (2013.01); *H04N 5/85* (2013.01); *H04N 5/765* (2013.01)
USPC ........................................................ 386/297

(58) Field of Classification Search
CPC .......... H04N 21/4583; H04N 21/6581; H04N 21/8126; H04N 5/00; H04N 5/50; H04N 5/775; G11B 27/105; G11B 27/34
See application file for complete search history.

(56) References Cited

U.S. PATENT DOCUMENTS

| 6,957,445 | B1 | 10/2005 | Liebenow | |
|---|---|---|---|---|
| 7,088,910 | B2* | 8/2006 | Potrebic et al. | 386/291 |
| 7,369,749 | B2* | 5/2008 | Ichioka et al. | 386/291 |
| 7,882,528 | B1* | 2/2011 | Taylor et al. | 725/58 |
| 2005/0002638 | A1 | 1/2005 | Putterman et al. | |

(Continued)

FOREIGN PATENT DOCUMENTS

WO    2006060157 A2    6/2006

*Primary Examiner* — Huy T Nguyen
(74) *Attorney, Agent, or Firm* — Browdy and Neimark, PLLC

(57) ABSTRACT

A system a method and a module for recording programs comprising media content data, transmitted by a media content provider via communication channels, where each program is associated with metadata containing details relating to the program. The method comprises: identifying related programs; online recording of programs of at least one predefined communication channel, that were identified as related programs, according to predefined recording rules, using a recording device and enabling at least one viewer to select and view recorded programs, using a video-audio display unit. The identification of related programs is carried out by analyzing the metadata associated with each transmitted program identifying at least one relation of at least one relation type between at least some of the programs. The identified related programs are associated with programs groups, each group representing the relation relating all programs in the group and the relation type associated therewith.

32 Claims, 7 Drawing Sheets

(56) References Cited

U.S. PATENT DOCUMENTS

| | | |
|---|---|---|
| 2005/0002649 A1* | 1/2005 | Boyle et al. .................... 386/83 |
| 2005/0240968 A1 | 10/2005 | Knudson et al. |
| 2006/0146436 A1 | 7/2006 | Goodwin et al. |
| 2007/0122108 A1 | 5/2007 | Bontempi |
| 2007/0180057 A1* | 8/2007 | McEnroe .................... 709/218 |
| 2008/0184308 A1* | 7/2008 | Herrington et al. ............. 725/43 |
| 2009/0037956 A1* | 2/2009 | Bennett et al. .................. 725/44 |
| 2011/0067067 A1* | 3/2011 | Ellis ............................... 725/50 |

* cited by examiner

SYSTEM AND METHOD FOR RECORDING RELATED PROGRAMS COMPRISING MEDIA CONTENT RELATED DATA

BACKGROUND

1. Field of the Invention

The present invention relates generally to the field of systems and methods for video recording of television programs, and more particularly, the present invention relates to systems and methods for video recording of related television programs.

2. Discussion of Related Art

Cable, satellite, Internet Protocol Television (IPTV) or Over the Top (OTT) television (TV) is, in general, a popular system enabling to provide a multiplicity of customers or viewers, using television systems that include TV devices and Set-Top Boxes, with a multiplicity of television and radio programs broadcasted and transmitted to the viewers through various communication networks and techniques.

A Set-Top Box (STB) is a device that can receive signals from at least one receiver for TV and radio transmissions, where the STB can further connect to a TV device (especially to a digital TV enabling to read digital signals) and turn the received signals into media content data to enable displaying the media content to viewers using the TV device. An STB may be a stand-alone device or may be embedded in the TV or the viewing device.

The signals' transmission of the media content data is usually divided into channels, each channel enables receiving and displaying different content data of different programs, so that in any given moment the viewer can select to view a program delivered through one of the channels.

The STB facilitates the display of an electronic programs guide (EPG), which is an on-screen TV guide enabling the display of the schedules of future and present broadcast TV, radio programs or any other broadcasted media and allow other operations and information retrieval and presentation such as: navigating through channels and through programs' schedules, select programs, define notification parameters and schedules for notifying the viewer when his selected program begins, retrieve information relating to each program on the guide, etc.

The STB can be operatively associated with a recording device such as a Videocassette Recorder (VCR) or a Digital Video Recorder (DVR) that may allow the viewer to record programs. The STB may also contain storage (e.g. hard disk, flash memory) to allow content data recording.

The DVR can be integrated in the STB allowing the viewer to operate a recording of a specific TV program in a specific channel by selecting the program, using the EPG, and selecting a recording option in the EPG interface (e.g. by using predefined button in a remote control that is operatively associated with the STB and may further be associated with the TV device, to operate the recording of a program).

BRIEF SUMMARY

The present invention, in some embodiments thereof, provides a system, a module and a method enabling identifying and recording of related programs such as episodes of series, news broadcasts, talks sows etc. associated to one another by any predefined association, out of future and/or past and/or present programs to be broadcasted or transmitted, respectively.

Each program may comprise media content data (e.g. video/audio or both), transmitted by a media content provider via communication channels, where each program may be associated with metadata containing details relating to the program (e.g. title, schedule, creators, type of program, etc.).

According to some embodiments of the invention, the method may comprise:
identifying related programs;
online recording of programs of at least one predefined communication channel, that were identified as related programs, according to predefined recording rules, using a recording device and
enabling at least one viewer to select and view recorded programs, using a video-audio display unit.

According to some embodiments, the identification of related programs is carried out by analyzing the metadata associated with each broadcasted program identifying at least one relation of at least one relation type between at least some of the programs.

The identified related programs may be associated with programs group, each group (e.g. a specific series) representing the relation relating all programs in the group and the relation type associated therewith (e.g. a series relation, a news relation etc.).

According to some embodiments of the invention, a system may be provided comprising:
a media content provider, enabling to provide and distribute audio and video media content through at least one media distribution network;
an video-audio display unit enabling presenting media content comprising audio and visual content;
a media content module, enabling to receive media content data and metadata of programs through communication channels and other data related to the programs and play the transmitted content data through the video-audio display unit;
a main related programs module, enabling to identify programs that are related to one another as related to program groups and the group each related program is associated with, to operate and control recording commands to enable recording of the identified related programs, and to enable at least one viewer to select and view recorded episodes of series; and
a recording device, enabling to record identified related programs, comprising and store the recorded content, wherein the recording device is operated by the main related programs module.

According to some embodiments of the invention, a main related programs module may be provided, comprising:
an analysis module, enabling to identify related programs and identify the group each related program is associated with; and
a recording module, enabling to operate a recoding device to record at least some of the identified related programs, according to predefined recording rules.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

DESCRIPTION

Figure 1:
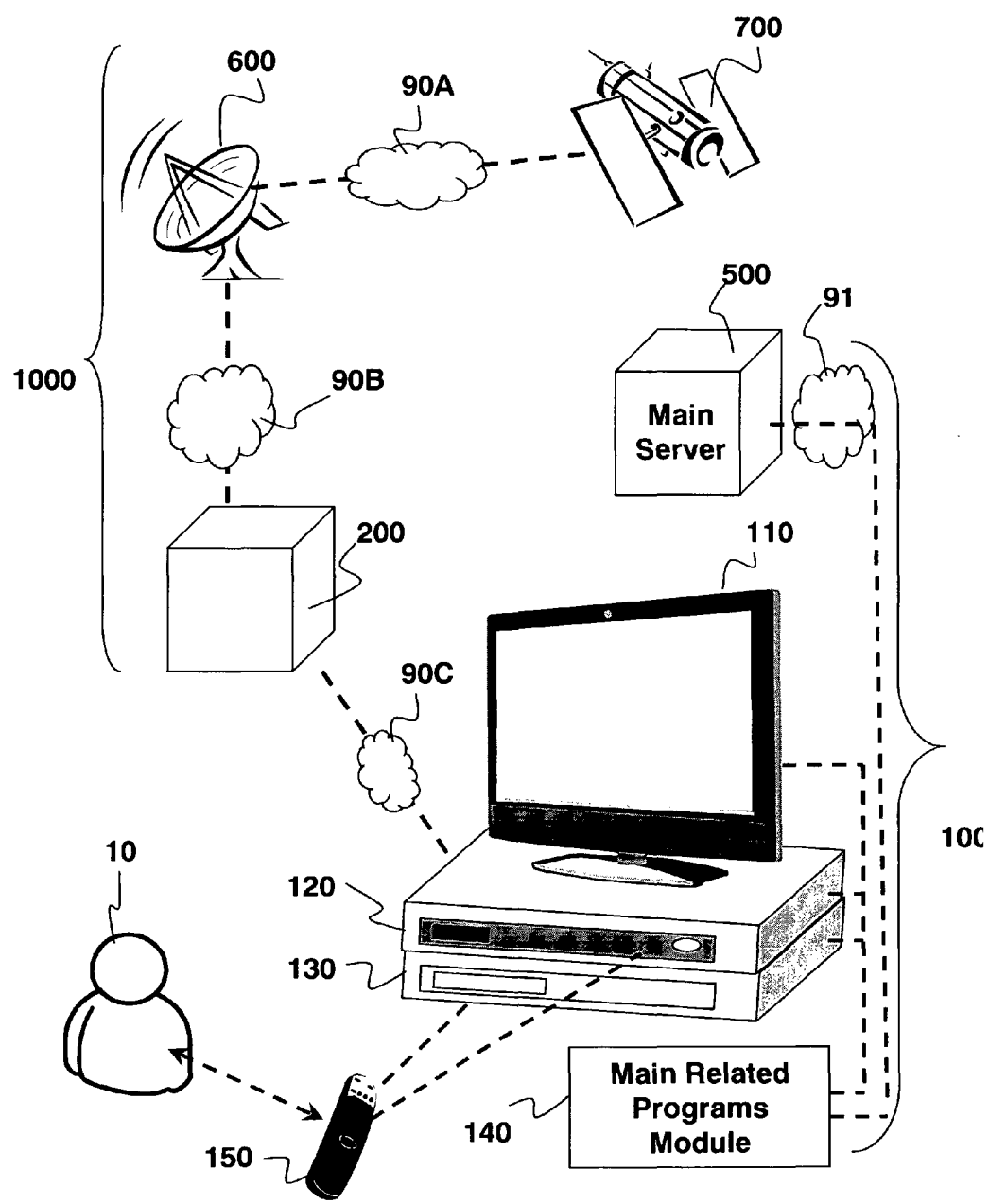
FIG. 1 is a block diagram, schematically illustrating a system for identifying and recording related programs comprising media content, according to some embodiments of the invention.

Reference will now be made in detail to embodiments of the present invention, examples of which are illustrated in the accompanying drawings, wherein like reference numerals refer to the like elements throughout. The embodiments are described below to explain the present invention by referring to the figures.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as to which the invention belongs, unless otherwise defined. The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The present invention, in some embodiments thereof, provides a system and a method for recording and identifying related programs comprising media content data such as video and audio content data (e.g. television and radio programs broadcasted through cable TV) enabling viewers to select and view recorded related programs.

A program is a content unit comprising of media content data (e.g. video and audio data or audio data) and associated metadata (e.g. actor, director).

A related program may be any program that is associated with a group of programs of one or more program types such as: an episode of a series, news, talk shows, interviews or documentaries relating to the same subject, etc. Each related program may be associated with a group such as the specific series, the specific news program and the like. Each program may be associated with a program type such as an episode type, a news type etc.

An episode is a program that is associated with a series where a group of associated episodes (programs) is defined as the series. For example, a television series that is organized according to a predefined order of episodes (e.g. "Seinfeld" chapter 1, 2, 3, etc. each chapter comprises media content data and the program is titled with text, where a part of the text of the title of each episode is the same for all episodes (e.g. the word "Seinfeld").

FIG. 1 is a block diagram, schematically illustrating a system 100 for identifying related programs, programs types and groups and recording identified related programs, according to some embodiments of the invention.

The system 100 may comprise at least some of:

a video-audio display unit 110, such as a television device, which may comprise a digital and/or analog inlet and outlet enabling presenting media content comprising audio and visual content, as known in the art;

a media content module 120 such as a set top box (STB) or a module that is embedded in the video-audio display unit 110, which enables receiving signals from at least one communication system 1000 for transmitting and presenting (e.g. through broadcasting) of television and radio content, where the media content module 120 may further connect to the video-audio display unit 110 and turn the received signals into media content data to enable displaying the media content to viewers using the video-audio display unit 110, where the media content comprises programs, each associated with a communication channel, enabling a viewer 10 to select a channel and display the program via the video-audio display unit 110, according to the selected channel and other programs related information;

a recording device 130, enabling to record programs, comprising media content data from the media content module 120 and store the recorded content data, where the recording device 130 may be a separate device or an embedded device embedded in the media content module 120;

a main related programs module 140, enabling to receive content and meta data and identify recorded programs that are related and the type and group each related program is associated with and to operate the recording device 130 for recording identified related programs; and a main server 500, which may be a remote server operatively associated with the main related programs module 140 (enabling to operate the main related programs module 150), by enabling transmitting and receiving data and commands from and/or to the main related programs module 140 through at least one communication network 91 and processing content and metadata.

The main server 500 may further enable recording and storing the recorded related programs and metadata relating to each program (e.g. by including the recording device therein), to allow retrieval and presenting (playing) of the recorded programs and of their related metadata.

The metadata associated with each program may include information relating to the program such as the title (name) of the program, the schedule of the presenting of the program, the type of the program (news, episode, talk show, etc.), the genre of the program, the creators of the program (e.g. actors, director, producer, etc.) a brief summary of the content of the program, etc.

A communication channel may be, for example, a broadcasting channel or a multicast channel, as known in the art. The term "broadcasting" is used as an example throughout the document and should be inferred, in general, as at least one of broadcasting, multicasting, unicasting or any type of transmission of video and/or audio data.

According to embodiments, the main related programs module 140 may be running at the main server 500 while the recording device 130 may be remotely operated by the main related programs module 140 to enable recording of related programs.

According to embodiments, the media content module 120 may be operatively associated with the video-audio display unit 110; the recording device 130; and the main related programs module 140.

According to some embodiments of the invention, the system 100 may enable receiving metadata associated with each program presented or that is to be presented and to identifying related programs; operating of online recording of related programs of at least one predefined communication channel, according to predefined recording rules; and enabling at least one viewer to select recorded programs for viewing and view recorded programs, using the video-audio display unit 110.

The programs content data and metadata may be transmitted to the system 100 and provided by at least one communication system 1000 such as, for example a cable TV provider, IPTV provider, OTT provider and the like, as known in the art. The communication system 1000 may transmit the content data and metadata of programs to the media content module 120 (e.g. STB) and optionally to the main related programs module 140. Alternatively, the main related programs module 140 may retrieve metadata (and optionally content data) directly from the media content module 120.

The identification of related programs may be carried out by the main related programs module 140, by analyzing the metadata associated with each program identifying at least one relation of at least one relation type between at least some of the programs, where the identified related programs are associated with programs groups, each group representing the relation relating the programs in the group and the relation type associated therewith.

According to some embodiments of the invention, the analysis and identification may be carried out using future and present programs to be transmitted and presented (e.g. broadcasted). The system 100 may enable recording only future programs that are identified as related programs according to predefined recording rules, such as, for example, only identified related programs that were selected by the viewer 10 (e.g. by presenting the viewer with all groups of identified related programs and their identified related programs, enabling the user to select related programs for recording out of the list through a predefined interface settings).

According to alternative embodiments, the system 100 may enable automatically recording all identified future related programs of predefined future scheduling time-limit.

According to other embodiments, the system 100 may enable automatically recording all programs of predefined communication channels and then identify the programs which are related, retrospectively, using the main related programs module 140.

The recording device 130 may be either a videocassette recorder or a Digital Video Recorder (DVR).

The main related programs module 140 may further enable presenting a viewer 10 with a list of all recorded groups (e.g. TV series) allowing the viewer 10 (e.g. using his remote control 150) to select a series he/she wishes to watch and upon a selection of the group (e.g. series) and to present a list of all recorded related programs (e.g. episodes of the series) associated with the selected group from which the viewer 10 may select a related program for viewing. Upon selecting a recorded related program, the system 100 may automatically play the selected related program, using the vide-audio display unit 110.

According to embodiments, the recording device 130 may be integrated with the media content module 120 (e.g. an STB with recording abilities, as known in the art).

According to embodiments, the communication system 100 may include at least one media content provider 200 enabling to provide broadcasting services (such as a cable TV provider etc. as known in the art).

According to embodiments, as illustrated in FIG. 1, the communication system 1000 may further comprise one or more transmitters e.g. satellite transmitter 700 enabling to transmit content and meta data through at least one receiver 600 using one or more broadcasting networks 90A, 90B and/or 90C such as through wireless communication networks using RF signals, optically based networks such as fiber communication based networks etc. as known in the art.

According to embodiments, as illustrated in FIG. 1, at least one of: the recording device 130, the video-audio display unit 110 and/or the media content module 120, may be operated and controlled through at least one remote control 150, as known in the art.

Figure 2:
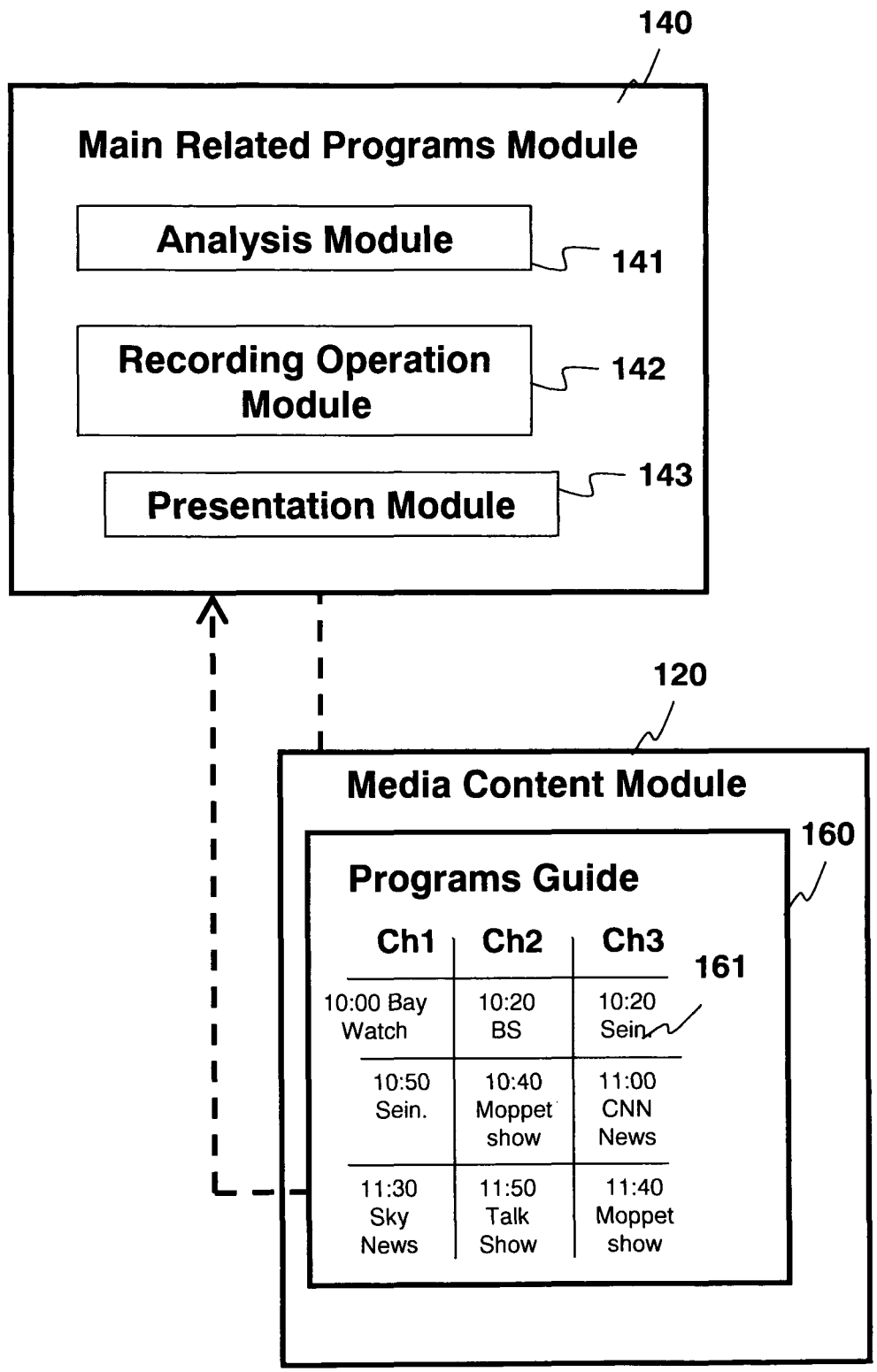
FIG. 2 is a block diagram, schematically illustrating a main related programs module for identifying related programs such as episodes of television series enabling to operate recording of episodes of the identified series, according to some embodiments of the invention.

FIG. 2 is a block diagram, schematically illustrating a main related programs module 140 for identifying related programs and operating the recording of at least some of the identified related programs, according to some embodiments of the invention. The main related programs module 140 may comprise:

an analysis module 141, enabling to identify related programs and at least one group of related programs comprising related programs associated thereto by analyzing the metadata of each program that is to be broadcasted or was broadcasted;

a recording operation module 142, enabling to define the channels of the media content module 120 from which the programs are recorded and define or tune other recording settings and to operate the recording device 130 for recording of identified related programs according to predefined recording rules; and a presentation module 143, enabling to display lists of groups and related programs, and optionally the type of each identified related program to allow the user to select related programs for viewing and operate the playing of selected related programs.

According to embodiments, as illustrated in FIG. 2 the main series module 140 may be operatively associated with a programs guide 160, which may include an interface comprising the title of each future program, the channel each program is to be broadcasted through, the type of each program (e.g. news, comedy series, talk show etc.) and the schedule of each program's broadcasting, where the main related programs module 140 enables displaying indicators 161 indicating all identified recorded related programs in the programs guide 160, and enable the viewer 10 to select related programs for viewing (e.g. upon positioning a marker upon each selected related program and pressing an "enter" button in the remote control 150 to validate the selection).

The indicators 161 may visually indicate the related programs in the guide 160 (e.g. indicated by the color of the text representing the title of the program).

According to embodiments, as illustrated in FIG. 2 the programs guide 160 may be embedded in or transmitted through the media content module 120.

According to embodiments, as illustrated in FIG. 2 the recorded programs may be stored in at least one recorded content database 50 associated with the system 100 (e.g. with the recording device 130).

According to some embodiments of the present invention, system 100 may be implemented within a personal video recorder (PVR) thereby enabling the personalized recoding of the identified series responsive to a user's preferences, profile and behavior.

Figure 3:
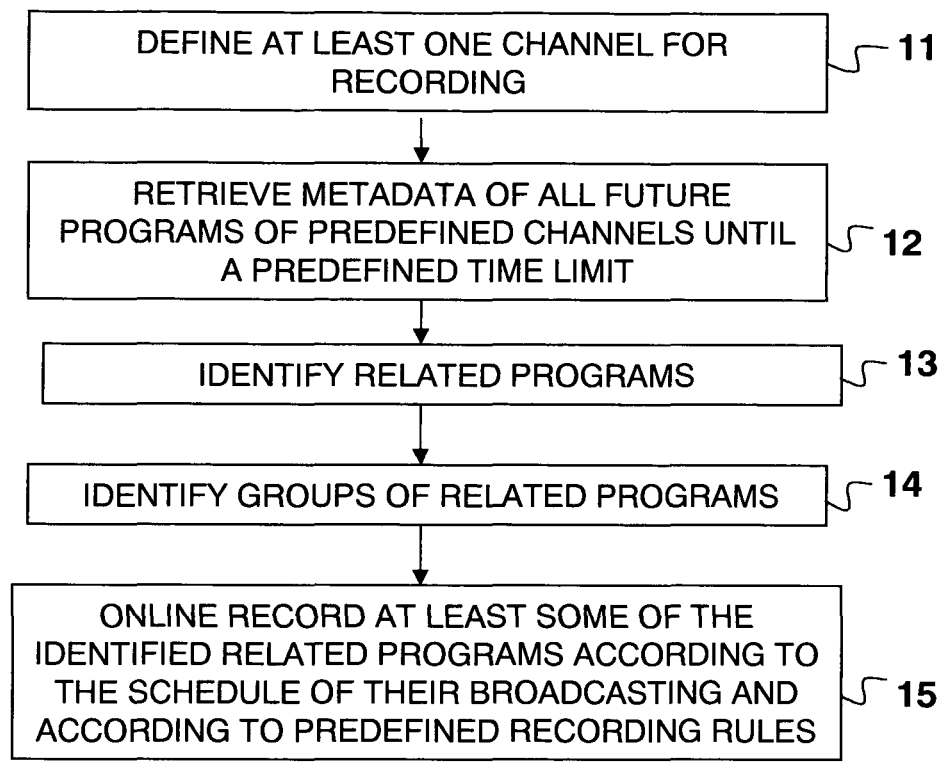
FIG. 3 is a flowchart, schematically illustrating a method for identifying and recording related programs, according to some embodiments of the invention.

FIG. 3 is a flowchart, schematically illustrating a method of identifying related programs and their associated groups, according to some embodiments of the invention.

According to these embodiments, the method may comprise:

defining at least one channel for recording 11;

retrieving metadata of all future programs to be broadcasted until a predefined time limit of all defined channels 12 (e.g. from the programs guide 160);

identifying related programs 13 by analyzing the metadata retrieved;

identifying groups (e.g. series) of related programs 14 thereby associating each identified related program to a specific group; and online recording of at least some of the identified related programs, according to predefined recording rules 15 (e.g. by operating the recording device 130 to allow recording the at least some related programs according to their broadcasting schedules and the recording rules).

Figure 4:
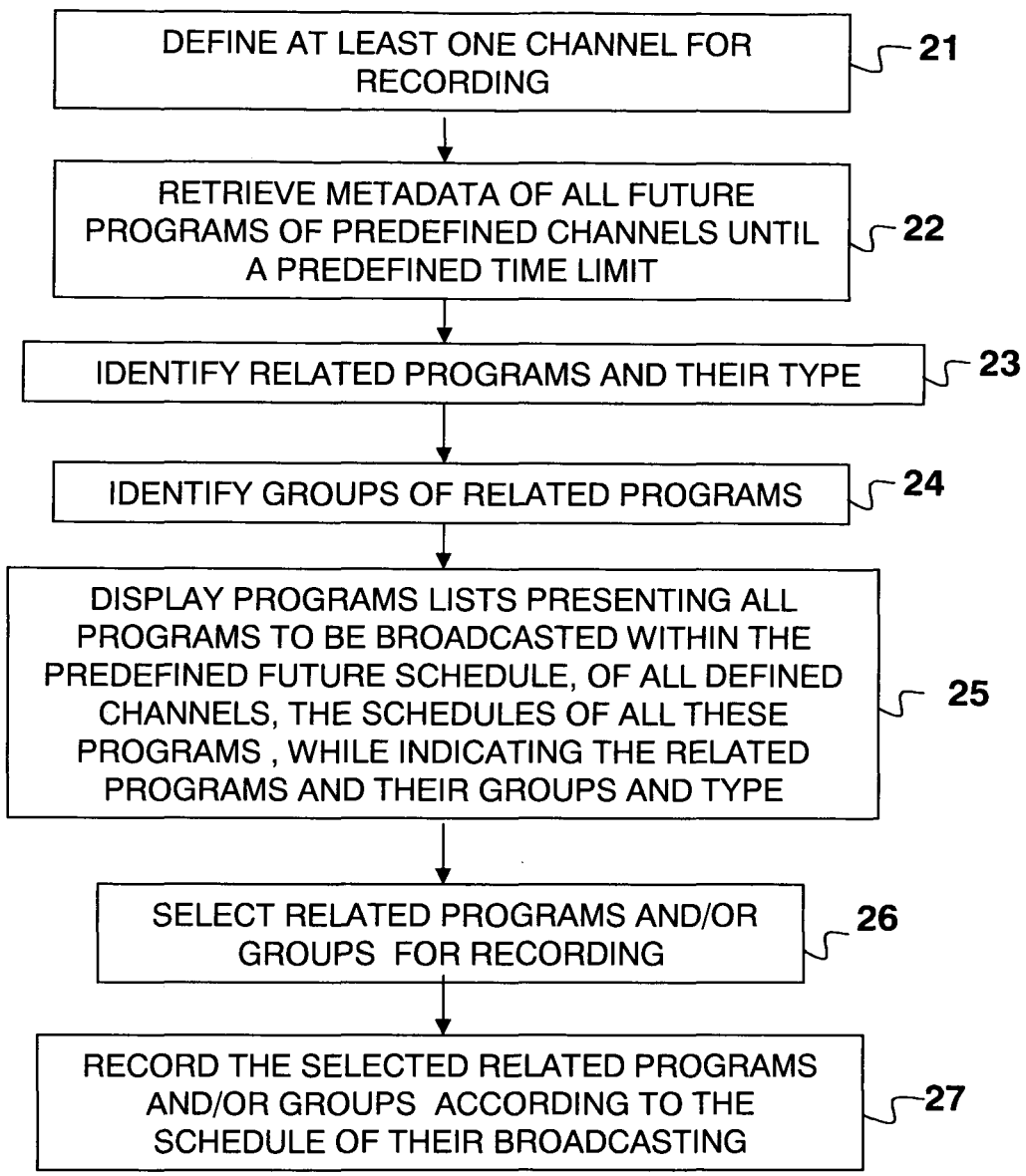
FIG. 4 is a flowchart, schematically illustrating a method for identifying and recording related programs, according to some embodiments of the invention.

FIG. 4 is a flowchart, schematically illustrating a method for identifying and recording related programs, according to some embodiments of the invention, in which the recording rules allow the viewer to select future related programs for recording. The method, as illustrated in FIG. 4, may comprise:

defining at least one channel for recording 21;

retrieving metadata of all future programs to be broadcasted in the future until a predefined time limit of all defined channels 22 (e.g. from the programs guide 160);

identifying related programs and their type (e.g. episode of a series, news, talk show, etc.) 23 by analyzing the metadata retrieved;

identifying groups (e.g. series) of related programs 24 thereby associating each identified related program to a specific group;

displaying programs lists presenting all programs to be broadcasted in the future within the predefined future time limit and channels and the scheduling of the programs, while indicating (e.g., by indicators 161) all identified related programs, the type of each identified related program and its associated group 25;

selecting related programs and/or groups for recording 26, which may be carried out by the viewer 10; and online recording the selected related programs and/or all related programs of the selected groups according to the future broadcasting scheduling of the selected related programs and or related programs in the selected group 27.

Figure 5:
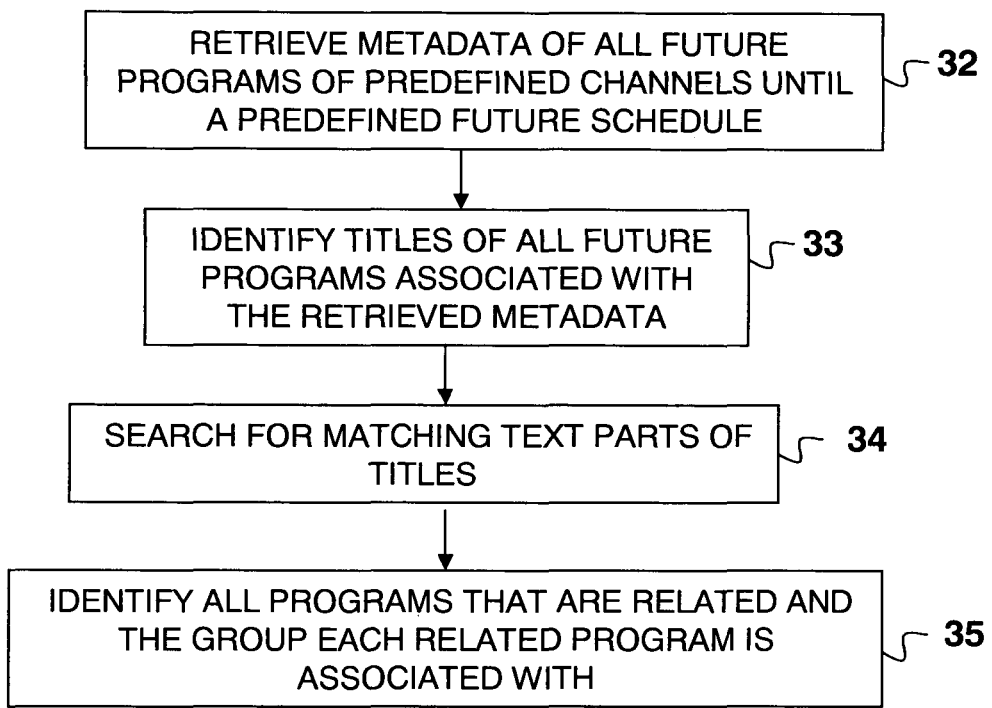
FIG. 5 is a flowchart, schematically illustrating a method for analyzing metadata associated with programs to identify related programs, according to some embodiments of the invention.

FIG. 5 is a flowchart, schematically illustrating a method for analyzing the metadata of programs for identifying related programs, according to some embodiments of the invention. The method for analyzing may comprise:

retrieving metadata of all future programs to be broadcasted until a predefined time limit of all defined channels including title of each program 32 (e.g. from the programs guide 160);

identifying titles of all programs associated with the retrieved metadata 33;

searching for matching text parts in the titles 34 identifying programs that have matching text parts as related to one another and the group each related programs of matching text parts are associated with 35.

Additionally or alternatively, the analysis of the metadata of each program for identifying related programs may further include retrieving a series ID and identifying titles of all previously recorded programs that have matching series ID; and identifying all programs that have the same matching series ID as episodes of the same series.

Figure 6:
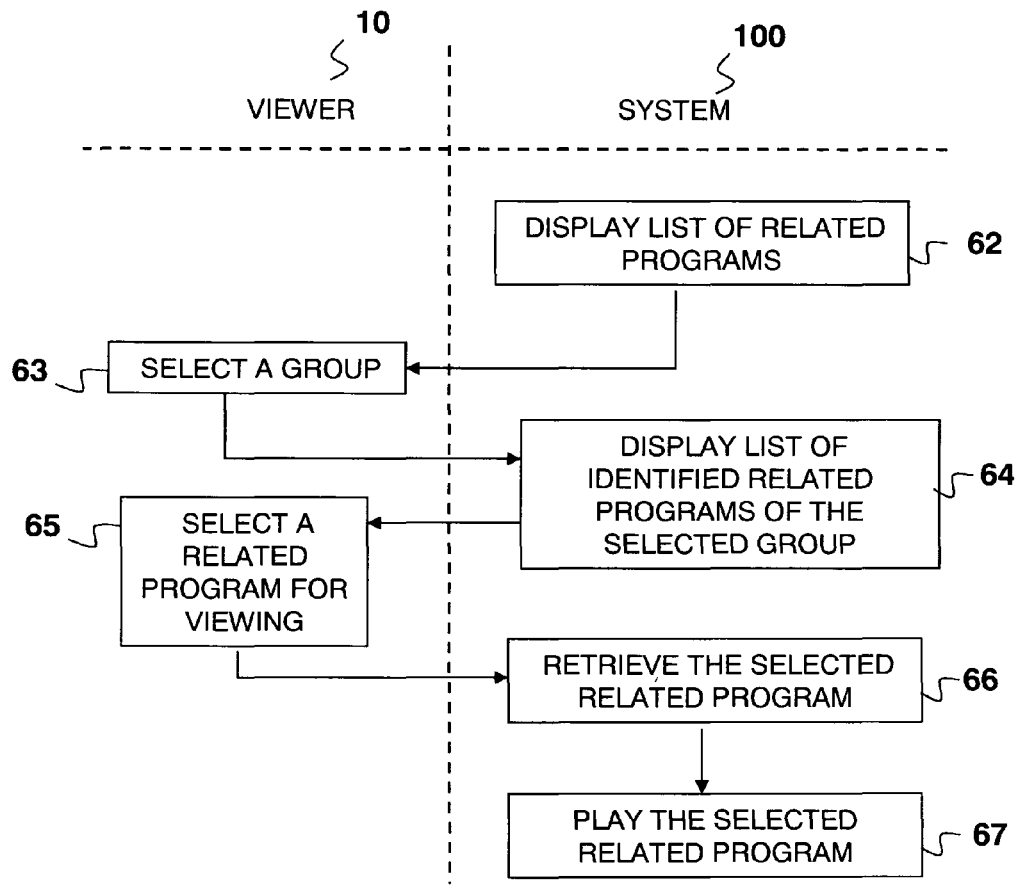
FIG. 6 is a flowchart, schematically illustrating a process of selecting and playing recorded related programs, according to some embodiments of the invention.

FIG. 6 is a flowchart, schematically illustrating a process of selecting and playing recorded related programs, according to some embodiments of the invention. The method illustrated in FIG. 6, may comprise:

displaying a list of identified groups 62, (e.g. where the presentation module 143 enables presenting the lists through the display unit 110);

selecting a group out of the list 63, where the viewer 10 manually carries out the selection;

displaying all identified related programs of the selected group 64;

selecting a related program out of the list 65, where the viewer 10 manually carries out the selection;

retrieving the selected related program 66; and playing the selected related program 67 (e.g. using the video-audio display unit 110).

According to some embodiments the method may further include deleting the recorded related programs according to predefined deletion rules such as (i) related programs that were not played until a predefined time limit, (ii) related programs that were played for a predefined number of times, (iii) upon the viewer's 10 selection, (iv) earliest recorded related programs, wherein the number of earliest recorded related programs that will be deleted is decided according to the memory volume of each of the earliest recoded related program in relation to the overall memory space available, etc.

Figure 7:
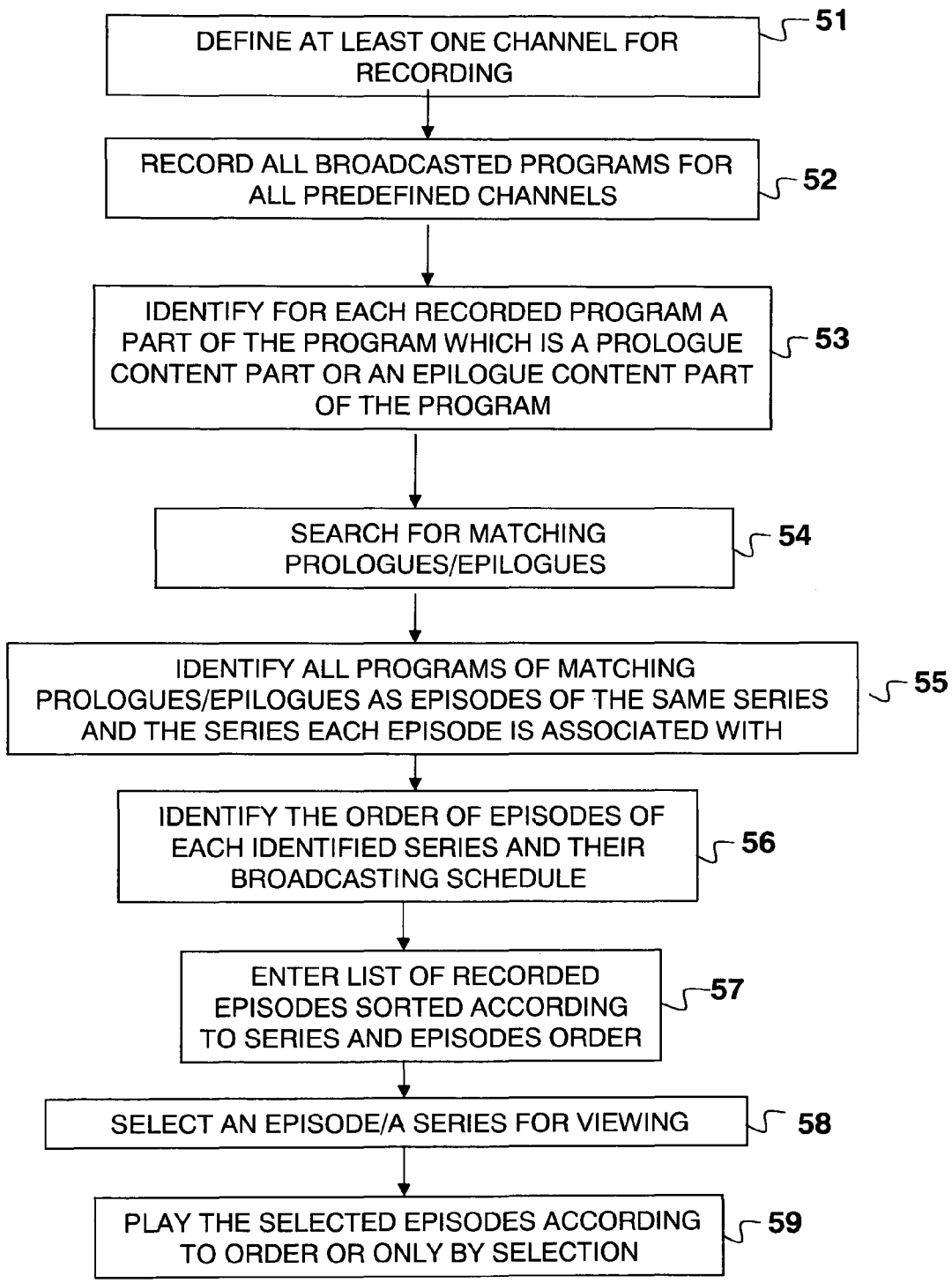
FIG. 7 is a flowchart, schematically illustrating a method for recording and identifying related programs, according to other embodiments of the invention.

FIG. 7 is a flowchart, schematically illustrating a method of recording and identifying programs that are episodes of series, according to other embodiments of the invention, where related programs are defined as episodes of series and each series is a group.

According to the other embodiments, the method may comprise:

defining at least one communication channel for recording 51;

online recording of all programs of the at least one predefined communication channel 52 (e.g. using the recording device 130);

for each recorded program—identifying a prologue content part (the first part of the content of the program) that or the epilogue of each program 53;

searching for matching prologues/epilogues 54;

identifying all programs that have the same matching prologue/epilogue as associated with the same series 55;

identifying the order of the episodes of each series 56;

entering a list of all recorded and identified series 57, e.g. where the viewer 10 enters the list through an interface provided by the series module 140 using the display unit 110;

selecting an episode/a series and then an episode of the selected series for viewing 58; and playing the selected episode 59, using the video-audio display unit 110.

Although various features of the invention may be described in the context of a single embodiment, the features may also be provided separately or in any suitable combination. Conversely, although the invention may be described herein in the context of separate embodiments for clarity, the invention may also be implemented in a single embodiment.

While the invention has been described with respect to a limited number of embodiments, these should not be construed as limitations on the scope of the invention, but rather as exemplifications of some of the embodiments thereof, including a preferred embodiment. The scope of the invention should not be limited by what has been described, but by the appended claims and their legal equivalents.

What is claimed is:

1. A method of recording programs comprising media content data, transmitted by a media content provider via at least one communication channel, wherein each program is associated with metadata containing details relating to the program, said method comprising:

identifying related programs of at least one communication channel; and online automatic recording of the identified related programs of at least one predefined communication channel according to predefined recording rules, using a recording device for enabling at least one viewer to select and view the recorded programs, using a video-audio display unit, wherein the identification of related programs is carried out by analyzing the metadata associated with each transmitted program identifying at least one relation of at least one relation type between at least some of the programs, wherein said identification of related programs is done automatically allowing a user to select already recorded related programs, wherein the identified related programs are associated with programs groups, each group representing the relation relating all programs in the group and the relation type associated therewith, and wherein said identification of a related program comprises identifying at least one text part of the title of each program as an ID of the program and identifying matching IDs of programs by identifying all programs that have matching text parts in their titles as associated with the same programs group.

2. The method of claim 1, wherein the at least one identifiable relation type comprises a series relation, wherein the analysis enables identifying related programs that are associated episodes of series and the specific series, as a specific group, each identified related programs is associated with.

3. The method of claim 2, wherein the at least one relation type further comprises at least one relation type which is implicit, where the implicit relation type may include at least one of:

creator association, relating programs according to at least one of the creators of one program is a creator in another program, wherein the creator includes at least one of: an actor, a producer, a director;

schedule association, relating programs according to broadcasting schedule of programs; and genre association, relating programs according to the genre of the program.

4. The method of claim 2, further comprising identifying the order of the episodes within each identifies series.

5. The method of claim 2, wherein the identification of the series is carried out by:

retrieving a series ID and identifying titles of all previously recorded programs that have matching series ID; and identifying all programs that have the same matching series ID as episodes of the same series.

6. The method of claim 1, wherein the recording rules include automatically recording all programs that are identified as related programs according to the schedule of broadcasting of the related programs.

7. The method of claim 6, further comprising:

transmitting a viewing offer to the at least one viewer;

enabling the at least one viewer to enter a list of all recorded related programs sorted according to the groups with which the recorded related programs are associated;

enabling the at least one viewer to select a recorded related program of from the list; and playing the selected related program.

8. The method of claim 1, wherein the recording rules include:

assigning an indicator to each identified related program, indicating, for each related program, at least one of: that the program is a related program, the group the program is associated with, the relation type;

presenting a representation of all identified related programs, the indicator and their schedules to the viewer;

enabling the viewer to select related programs for viewing; and transmitting operation commands enabling to view the selected related programs.

9. The method of claim 8, further comprising:

displaying a list of groups of recorded related programs;

selecting a group of related programs out of the list, wherein the at least one viewer carries out the selection;

displaying all recorded related programs of the selected group;

selecting a related program out of the list, wherein the at least one viewer carries out the selection of a related program;

retrieving the selected related program; and playing the selected related program.

10. The method of claim 1, further comprising deleting some of the recorded related programs according to deletion rules.

11. The method of claim 10, wherein the deletions rules include at least one of:

related programs that were already played more than a predefined number of times;

all related programs that were recorded before a predefined time limit; and earliest recorded related programs, wherein the number of earliest recorded related programs that will be deleted is decided according to the memory volume of each of the earliest recoded related program in relation to the overall memory space available.

12. The method of claim 1, further comprising defining communication channels from which related programs are to be recorded.

13. The method of claim 1, wherein the recording is carried out by the recording device, enabling to store media content data and metadata associated with programs, which is embedded in a media content module connected to the video-audio display unit, and wherein the analysis of the metadata, the media content data and the identification of related programs is carried out by a remote main server, enabling to transmit data relating to identified related programs to the media content module.

14. The method of claim 2, wherein the identification of programs as episodes in a series is carried out by:

for each recorded program, identifying a part of the content of the program that is in at least one of: in the beginning or in the end of the program that is defined as a prologue or an epilogue of the programs, respectively;

searching for matching at least one of prologues or epilogues of the recorded programs; and identifying all programs that have the same matching prologue or epilogue are associated with the same series.

15. A system of recording programs transmitted through at least one communication channel, each program comprising media content, wherein each program is associated with metadata comprising details relating to the program, said system comprising:

a media content provider, enabling to provide and distribute audio and video media content through at least one media distribution network;

a video-audio display unit enabling presenting media content comprising audio and visual content;

a media content module, enabling to receive media content data and metadata of programs through at least one communication channel and other data related to the programs and play the transmitted content data through the video-audio display unit;

a main related programs module, configured for automatically identifying programs that are related to one another as related to program groups and the group with which each related program is associated, operating and controlling recording commands to enable automatic recording of the identified related programs, and to enable at least one viewer to select and view already recorded related programs, said identification of related programs comprising identifying at least one text part of the title of each program as an ID of the program and identifying matching IDs of programs by identifying all programs that have matching text parts in their titles as associated with the same programs group; and a recording device, enabling to record identified related programs, comprising and store the recorded content, wherein the recording device is operated by the main related programs module.

16. The system of claim 15, wherein the media content module is a set top box (STB), which enables receiving signals from at least one receiver for television and radio transmissions, where the STB further connects to a video-audio display unit and turns the received signals into media content data to enable displaying the media content to viewers using the video-audio display unit, where the media content comprises programs, each associated with a communication channel, wherein the STB further enables the viewer to select a channel and display the program according to the selected channel and other programs related information.

17. The system of claim 15, wherein the media content module is embedded within the video-audio display unit.

18. The system of claim 15, further comprising a programs guide comprising metadata relating to each program that is to be transmitted.

19. The system of claim 18, wherein the metadata of each program to be transmitted comprises the title of each program, the channel each program is to be transmitted through and the schedule of each program's transmission.

20. The system of claim 15, wherein the main related programs module is embedded in the recording device, enabling to identify future related programs to be transmitted and record the identified future related programs according to predefined recording rules, according to the schedules of the identified programs that are to be recorded.

21. The system of claim 15, wherein the recording device is a digital video recorder (DVR).

22. The system the recording device claim 15, wherein the recording device is located at remote server associated with the media content provider, such that at least one user may view content recorded at the remote recording device, wherein the main related programs module is located at the media content module, wherein the identification of related programs is carried out by the main related programs module at the media content module and the recording and storing of the media content data of the related programs is automatically carried out by the remote main server.

23. The system of claim 15, wherein the main related programs module comprises:

an analysis module, enabling identify at least one series, which defines a group of programs that are related to one another by being episodes of the series;

a recording module, enabling to define the channels from which the identified related programs are to be recorded; and a presentation module, enabling to display lists of recorded episodes and series to allow the user to select episodes to watch and operate the playing of selected episodes.

24. The system of claim 15, wherein the episodes and programs are at least one of: television programs comprising video content data; radio programs comprising audio content data.

25. The system of claim 15, further comprising at least one recorded content database, in which all recorded programs and associated data are stored.

26. The system of claim 15, wherein the main related programs module further enables deleting recorded related programs according to predefined deletions rules.

27. The system of claim 15, wherein the system is implemented within a personal video recorder (PVR) thereby enabling personalized recoding of the identified related programs responsive to at least one of: viewer's preferences, viewer's profile, viewer's behavior.

28. The system of claim 15, wherein the main related programs module further enables:
   assigning an indicator to each identified related program, indicating, for each related program, at least one of: that the program is a related program, the group the program is associated with, the relation type;
   presenting a representation of all identified related programs, the indicator of each related program and the schedule of each related program to the viewer;
   enabling the viewer to select related programs for recording; and
   transmitting recording operation commands to the recording device, enabling to record the selected related programs, according to the scheduling of the selected related programs.

29. A main related programs module comprising:
   an analysis module enabling to automatically identify related programs and identify a programs group with which each related program is associated, wherein said identification of related programs comprises identifying at least one text part of the title of each program as an ID of the program and identifying matching IDs of programs by identifying all programs that have matching text parts in their titles as associated with the same programs group; and
   a recording module, enabling to operate a recording device to automatically record the identified related programs, according to predefined recording rules.

30. The main related programs module of claim 29, further comprising a presentation module, enabling to display a list of all identified groups of related programs and all identified related programs to allow at least one viewer to select at least one related program and to enable playing the selected at least one related program through a video-audio display unit.

31. The main related programs module of claim 29, wherein the analysis module further enables identifying program groups by:
   retrieving metadata including a title of each program that was identified as a related program;
   identifying titles of recorded programs that have matching text parts; and
   identifying all programs that have the same matching text parts as related programs of the same group, thereby identifying each group and the group name as the matching text parts.

32. A system of recording programs transmitted through at least one communication channel, each program comprising media content, wherein each program is associated with metadata comprising details relating to the program, said system comprising:
   a media content provider, enabling to provide and distribute audio and video media content through at least one media distribution network;
   a video-audio display unit enabling presenting media content comprising audio and visual content;
   a media content module, enabling to receive media content data and metadata of programs through communication channels and other data related to the programs and play the transmitted content data through the video-audio display unit;
   a main related programs module, configured for automatically identifying programs that are related to one another as related to program groups and the group with which each related program is associated, to operate and control recording commands to enable automatic recording of the identified related programs, and to enable at least one viewer to select and view recorded related programs, said identification of related programs comprising identifying at least one text part of the title of each program as an ID of the program and identifying matching IDs of programs by identifying all programs that have matching text parts in their titles as associated with the same programs group; and
   at least one remote main server, operatively associate with the video-audio display unit and with the media content module, configured for automatically recording and storing related programs, details related to said recorded programs and operate said main related programs module and to present recorded related programs through said video-audio display unit.

* * * * *